United States Patent Office 3,024,208
Patented Mar. 6, 1962

3,024,208
PROCESS FOR THE PRODUCTION OF POROUS POLYETHYLENE BODIES
Herbert Goethel, Oberhausen-Sterkrade, Eugen Jacob, Oberhausen-Holten, Helmut Kolling, Duisburg-Hamborn, and Otto Roelen, Oberhausen-Holten, Germany, assignors to Ruhrchemie Aktiengesellschaft, Oberhausen-Holten, Germany
No Drawing. Filed Oct. 16, 1958, Ser. No. 767,515
Claims priority, application Germany July 21, 1954
2 Claims. (Cl. 260—2.5)

The present invention is a continuation-in-part of our co-pending application Ser. No. 521,644, filed July 12, 1955, now abandoned, and relates to the discovery that porous bodies will be obtained when pourings of polyethylene of small particle size, especially of pulverulent polyethylene having a molecular weight ranging from 100,000 to 1,000,000 as determined viscosimetrically, are heated to temperatures above 120° C. and below a temperature at which decomposition and/or gelation of the polyethylene will occur, which temperature will depend on the operational pressure used; the simultaneous use of mechanical pressure is optional. By "gelation" as used herein we understand the formation of structures having a glassy-translucent appearance. Ethylene polymers having molecular weights of more than 100,000 and up to 1,000,000 as determined viscosimetrically, can be produced by means of suitable polymerization catalysts at pressures below 200 kg./cm.$^2$ and at temperatures up to 100° C.

The shaping of the polyethylene to be used as the start-material into small particles may be effected in any convenient manner. Apart from pulverulent material, the polyethylene particles may also be used, for example, in the form of granules, fibers, scales, rings, disks, rod-or tube sections, film sections or small polyhedrons. Mixtures of small particle size polyethylene consisting of particles of different shapes may also be used. For example, granules or scales mixed with fibers or film sections may be processed. The particle size should not exceed 0.3 mm.

The particular properties of the porous bodies, as described herein, are due to the crystalline and oriented structure of high-molecular polyethylene which is obtained by the polymerization of ethylene at pressures below 100 kg./cm.$^2$ and at temperatures up to 100° C. in the presence of catalysts consisting of mixtures of organometallic compounds, especially aluminum alkyls, with metal compounds of the 4th to 6th subgroups of the Periodic Tables, especially titanium halides. Other polymers can also be made into porous bodies, e.g. polyvinyl chloride, but their amorphous structure imparts different physical and mechanical properties from those according to the present invention.

It is of particular advantage to use the polyethylene directly as it is obtained in the polymerization. However, the material may also be subjected to a thermal and/or mechanical pretreatment. The material may also be processed with the admixture of pigments or fillers. Examples of fillers and pigments which may be used are: magnesium carbonate, kieselguhr, calcium carbonate, carbon black, titanium dioxide, and similar materials suited for the filling and coloring of plastics.

The reaction temperatures and the heating time to be used in accordance with the invention are dependent upon the working pressures and upon the finished products desired. If no external pressure or only a very low mechanical pressure is applied, the heating temperatures required range from 120 to approximately 400° C. The time for the operation ranges from 1 to 3 hours. In accordance with one embodiment of the invention, under certain conditions bodies resembling cork can be prepared. It is also possible within a certain range of these conditions to obtain bodies which are equal to cork with regard to density, porosity, and thermal conductivity. To obtain cork-like bodies, it is necessary to avoid the use of excessive pressures while sintering. It is expedient to operate without or with only moderate pressures as, for example, at 1–50 g./cm.$^2$. With polyethylene having molecular sizes of 300,000 to 600,000, for example, temperatures ranging from 130 to approximately 170° C. must be applied under these conditions. When using temperatures in excess of 170° C., porous bodies are obtained with a density higher than that of cork. In general, the hardness of the porous bodies formed increases with the temperature. The particular desired strength of the porous finished products can easily be obtained by heating for a sufficiently long period of time. The heating may be effected under elevated pressure produced, e.g. by mechanical pressing devices, especially by stamping devices, or pressing plates. A certain reduction in volume will always occur by the treatment of polyethylene in accordance with the invention.

The heating of the polyethylene pourings is expediently effected with the exclusion of air in an inert gas atmosphere as, for example, under vacuum or with the use of nitrogen or carbon dioxide.

The heat required for the production of porous masses can be supplied in any desired manner. For instance, the outside walls of the reaction vessels may be provided with tubes or heating jackets through which heating media, e.g. steam, pressure water, or organic liquids are passed in the liquid or gaseous state. The required heat may also be supplied by means of hot inert gases or steam which are directly passed through the small particle-size pourings during processing.

The production of the porous masses may also be effected by heating in successive stages. In this case, the small particle-size pourings containing ethylene polymerization products are treated, for example, in two stages with increasing temperatures and, if necessary or desired, different periods of heating.

If the pulverulent or small particle-size ethylene polymers are filled into containers and are heated therein under slight pressure, the masses attain their final shape directly during the production. By using tubes of circular or polygonal cross-section, there may be produced correspondingly profiled rods or strips, especially round bars, of porous masses. Porous plates may be produced in flat containers of even or dished shape, or by means of shelved presses whose metallic intermediate plates are brought to the desired temperature by liquid heat-transfer media. Various other shaped bodies may be produced from pulverulent polyethylene by means of heatable molds.

The porous bodies prepared in accordance with the invention can be shaped in various manners by mechanical processing, such as by pressing, cutting, stamping, or by cutting operations such as turning, drilling, milling, sawing, planing.

Due to their properties, the new porous masses are eminently suited for various purposes such as, for example, heat insulators, sound absorbers, floating bodies, e.g., lifebelts or life-jackets, in the electrical and cable industries, and for commodities of many kinds.

It has also been found that porous bodies produced in accordance with the invention can be oxidized superficially with hot air in such a manner as to form a thin layer on the surface which is impermeable to gases and liquids as, for example, to water. In this manner, shaped bodies of porous polyethylene can be protected against the penetration of gases, vapors or liquids. For this purpose the bodies to be treated are, for example, exposed for a short time to an air stream of 170–250° C. By such a partial oxidation of the surface, the interior of the bodies undergoes no change while their outer surface becomes impermeable.

For heat insulating purposes the porous bodies may be used in the form of sheets, dishes, strips, or tubes. Masses of this kind may also be poured into hollow spaces in a comminuted state as, for example, in the size of peas or nuts. Of particular advantage is the use of bodies according to the invention for low temperature insulation since they will not lose their elasticity even at the lowest temperatures, not even at the temperature of liquid air. In this case it is of advantage previously to oxidize shaped insulating bodies superficially, in order to prevent moisture from penetrating.

For electrical purposes, the extremely low loss angle of the porous bodies produced according to the invention is of particular advantage. For this reason, materials of this kind can be used with great advantage in the production of cables of all kinds. Due to the very good heat-pressure resistance they are especially suited as spacers for high-frequency cables.

The invention will now be described in a number of examples but it should be understood that these are given by way of illustration and not of limitation and that many changes in the details may be made without departing from the spirit of the invention.

EXAMPLE 1

A mold prepared from sheet aluminum having a width of 20 cm., a length of 30 cm. and a height of 5.5 cm. was filled with 300 g. pulverulent polyethylene having a particle size below 0.3 mm. After placing a tight-fitting cover on the mold and exerting a pressure of 16 kg. thereon, corresponding to a mechanical areal surface pressure of 26.7 g./cm.$^2$, the mold was maintained for three hours at a temperature of 150° C. in a heating cabinet. From the polyethylene charged in pulverulent form, a white porous plate formed which could easily be machined by cutting, sawing or drilling. The plate made in accordance with the invention had a density of 0.27, a porosity of 75 percent and a thermal conductivity of $\lambda=0.040$ which nearly corresponds to the properties exhibited by cork.

EXAMPLE 2

The mold used in Example 1 was charged with 500 g. polyethylene having a particle size of less than 0.3 mm. The cover of the dish was loaded (a) with 26.7 g./cm.$^2$ and then (b) with 3.3 g./cm.$^2$ pressure. Both tests were carried out over a treating period of 2 hours in a heating cabinet at 175° C. White porous plates were obtained. The plate from test (a) had a thickness of 1.8 cm., that from test (b) a thickness of 3 cm. Both plates could be machined by cutting, sawing or drilling. The test (a) plate, moreover, could easily be machined on a lathe.

The plates prepared in accordance with the invention had the following densities, porosities, and thermal conductivities:

*Table 1*

| Test | Load, g/cm.$^2$ | Density | Porosity, percent | Thermal conductivity |
| --- | --- | --- | --- | --- |
| (a) | 26.6 | 0.54 | 45 | 0.095 |
| (b) | 3.3 | 0.33 | 67 | 0.048 |

EXAMPLE 3

Glass cylinders of 35 mm. inside diameter and 200 mm. length were filled with 25 g. each of the same polyethylene as used in Example 1 which had previously been freed extensively from air by repeated evacuation under addition of nitrogen. A cylindrical piece of iron having a weight of 200 g., corresponding to a load of 21 g./cm.$^2$ was placed on the surface of the pulverulent polyethylene fillings. The glass cylinders were placed into an oil bath which was maintained at the desired temperature. The polyethylene fillings were under nitrogen protection for the entire duration of the test.

The properties of the porous cylindrical bodies obtained are summarized in the following Table 2:

*Table 2*

| Temperature, ° C. | Duration of test (hours) | Density | Porosity, percent | Thermal conductivity |
| --- | --- | --- | --- | --- |
| 200 | 1.5 | 0.58 | 40 | 0.110 |
| 225 | 1.5 | 0.60 | 38 | 0.115 |
| 250 | 1.5 | 0.63 | 35 | 0.118 |
| 275 | 1.5 | 0.65 | 33 | 0.122 |
| 300 | 1.5 | 0.66 | 32 | 0.142 |

EXAMPLE 4

A cylindrical porous body which had been produced by treating polyethylene having a particle size of below 0.3 mm. for 1.5 hours at 175° C. with a load of 21 g./cm.$^2$ was superficially melted with a hot air stream of 230° C. This resulted in a glassy continuous surface. The body treated in this manner was immersed in water for 24 hours and did not show any increase in weight after this time.

The polyethylene pourings may be heated in combination with pigments or fillers, or with both.

The porous polyethylene bodies, with or without admixtures, can be used for many widely varying purposes. Some examples of intended uses, which are by no means exhaustive, are: Plates, tubes, bands, rods, profiled bodies, floating bodies, such as life belts and life jackets, heat insulators, sound absorbers, in electrical equipment, such as cables, spacers for high frequency cables, and other articles of electrical insulation, articles for daily use in the home, the office, the workshop, and the industrial plant.

The term "shaped bodies" is intended to comprise the articles listed above and their equivalents.

The expression "small particle-size polyethylene pourings" should be understood to comprise polyethylene in the form of powders, granules, fibers, scales, rings, disks, rod sections, tube sections, plate sections, small polyhedrons, or mixtures thereof.

We claim:

1. A process for the production of rigid porous bodies, impermeable to gases and liquids, from substantially crystalline and oriented polyethylene having molecular weights of 100,000 to 1,000,000, as determined viscosimetrically, and obtained by the polymerization of ethylene at pressures below 100 kg./cm.$^2$ and at temperatures up to 100° C. in the presence of catalysts consisting of mixtures of aluminum alkyl compounds with titanium halides, which comprises heating pourings of said polyethylene, having a particle size of up to 0.3 mm., at temperatures of 120 to 400° C. and at pressures up to 50 g./cm.$^2$ for 1 to 3 hours, and rendering the rigid porous bodies thus obtained impermeable to gases and liquids by partial oxidation with a stream of air having a temperature of 170 to 250° C.

2. A process for the production of rigid porous bodies, impermeable to gases and liquids, from substantially crystalline and oriented polyethylene having molecular weights of 100,000 to 1,000,000, as determined viscosimetrically, and obtained by the polymerization of ethylene at pressures below 100 kg./cm.$^2$ and at temperatures up to 100° C. in the presence of catalysts consisting of mixtures of aluminum alkyl compounds with titanium halides, which comprises freeing pourings of said polyethylene, having a particle size of up to 0.3 mm., from air by repeated evacuation under addition of nitrogen, placing said pourings in a mold and heating them therein at a temperature of 120 to 400° C. and at pressures up to 50 g./cm.$^2$ for 1 to 3 hours in a nitrogen atmosphere, and rendering the rigid porous bodies thus obtained impermeable to gases and liquids by partial oxidation with a stream of air having a temperature of 170 to 250° C.

References Cited in the file of this patent

UNITED STATES PATENTS

| | | |
|---|---|---|
| 2,297,248 | Rudolph | Sept. 29, 1942 |
| 2,773,053 | Field et al. | Dec. 4, 1956 |
| 2,780,617 | Zletz | Feb. 5, 1957 |

OTHER REFERENCES

Kresser: "Polyethylene," published by Reinhold Publishing Co., New York, 1957, pages 8 and 9.